United States Patent Office 2,834,820
Patented May 13, 1958

2,834,820

SOLVENT EXTRACTION OF ORGANIC MIXTURES WITH MIXED GLYCOL ETHERS AS SOLVENTS

Herman S. Bloch, Chicago, Ill., assignor to Universal Oil Products Company, Des Plaines, Ill., a corporation of Delaware No Drawing. Application July 28, 1953
Serial No. 370,860

8 Claims. (Cl. 260—674)

This invention relates to an extraction process for separating mixtures of organic compounds in which process a selective solvent is utilized for one or more components of the mixture, said solvent comprising a heterogeneous ether of ethylene and propylene glycols. In a more specific and preferred application of the invention, the present process concerns the separation and recovery of particular classes of hydrocarbons from distillate fractions of petroleum or its conversion products, said process utilizing a selective solvent for one or more components of the hydrocarbon feed stock selectively soluble in the solvent to form an extract phase from which the selectively extracted component may be recovered substantially in its entirety.

In the solvent extraction of mixtures or organic compounds to recover one or more of the components thereof in relatively pure form, it has been generally observed that the selectivity of the solvent for the particular component to be recovered depends upon the relative polarity of that component with respect to the other compounds present in the organic mixture, the component having the greatest relative polarity being the most soluble in the solvent. When the process of solvent extraction is applied to hydrocarbon mixtures, the solubility of each class of hydrocarbons in the solvent decreases in the order; aromatic, cyclodienic, diolefinic, cyclo-olefinic, olefinic, naphthenic, branched chain aliphatic, and straight chain paraffinic. The present solvent, comprising the mixed ethers of ethylene and propylene glycols, may be utilized in extraction processes for the recovery of specific classes or any specific member of a class of organic compounds generally, but is particularly adapted to the recovery of aromatic hydrocarbons from other types and classes of hydrocarbons occurring in distillate fractions of petroleum, especially from mixtures thereof with paraffinic hydrocarbons. The use of glycols and mixtures of glycols as selective solvents for organic compounds and particularly aromatic hydrocarbons is now well known in the art and the use of mixtures of glycols has also previously been proposed as selective solvents for the extraction of hydrocarbon mixtures. Thus, it is known that the aromatic hydrocarbon components of a mixture of hydrocarbons comprising aromatic and aliphatic as well as naphthenic hydrocarbons are selectively soluble in both ethylene and propylene glycols and that ethylene and polyoxyethylene glycols are more selective than propylene or polyoxypropylene glycols for the most readily soluble components of the mixture that is, propylene and polyoxypropylene glycols, although they dissolve greater quantities of aromatic hydrocarbons per volume of solvent from hydrocarbon mixtures than ethylene and polyoxyethylene glycols, also dissolve greater quantities of the non-aromatic components of the hydrocarbon mixture subjected to solvent extraction. In extraction processes utilizing ethylene glycols, the selectivity of the glycol for the aromatic component is of such high order that relatively large volumes of the solvent must be employed in the extraction process to provide a commercially feasible operation in which the quantity of extracted organic compound dissolved in the solvent is sufficient to warrant its use in such a process. On the other, propylene glycol and its "polymers," such as dipropylene glycol (2,6-dihydroxy-4-oxaheptane) and tripropylene glycol (2,9-dihydroxy-5-methyl-4,7-dioxadecane) etc. contain a relatively high proportion of carbon-hydrogen linkages per molecule (relative to the number of hydrophilic hydroxy groups) and these solvents generally have a relatively low order of selectivity, although a relatively large solubility for organic compounds subject to extraction, such that relatively small ratios of solvent to feed stock may be utilized in the extraction process. In the case of propylene glycol and its ether-glycol condensation derivatives, the high degree of solubility of the glycol for organic compounds and its low order of selectivity generally necessitates mixing the glycol with water or other materials which dissolve in the glycol and which reduce the solubility of the undesired component or components of the feed stock mixture in the glycol, whereby the selectivity of the glycol for the desired component to be selectively recovered from the organic feed stock mixture is increased. In the absence of such modifying components in the polypropylene glycol, the solvent tends to dissolve excessive quantities of the normally raffinate components of the feed stock mixture, thereby reducing the selectivity of the solvent and its suitability for operative extraction processes. It has been found that mixtures of di- or polypropylene glycols with di- or polyethylene glycols form selective solvents which have the desired selectivity and yet dissolve a sufficient quantity of the organic compound to be recovered from the feed stock mixture to make feasible the use of the mixed solvent in an extraction process without the necessity of providing excessively high solvent-to-feed stock ratios in the extraction process. Such mixtures of polypropylene and polyethylene glycols in which each type of glycol is present individually in the mixture, however, do not have a constant vapor pressure and have other undesirable features as selective solvent, such as the selective solubility of the polypropylene glycols in the raffinate phase, which requires thorough scrubbing of the raffinate and close control of the solvent mixture to assure constancy of composition. It has now been found that the mixed ethers of ethylene and propylene glycols, that is, ethers containing both oxypropylene and oxyethylene units in the same molecule are ideally adapted as solvent extractants for the recovery in relatively pure form, of one or more components of a mixture of organic compounds, said mixed ethers having an unexpectedly good balance between the selectivity characteristics of polyethylene glycols and the desirable solubility characteristics of polypropylene glycols. Moreover, such mixed ethers when utilized in a solvent extraction process have a constant vapor pressure and raffinate solubility, are highly stable, and may be continuously reused in a cyclic process for solvent extraction of mixtures of organic compounds. Thus, the present mixed ethers possess all of the desired characteristics of mixtures of polyethylene and polypropylene glycols, but possess none of the disadvantageous properties characteristic of such mixtures of the individual glycols. The present invention is directed toward the use of mixed ethers of ethylene and propylene glycols containing both oxyethylene and oxypropylene units in the individual compound comprising the selective solvents, the latter being useful for the solvent extraction of mixtures of organic compounds containing at least one component selectively soluble in the mixed glycol-ether relative to other components of the feed stock.

In one of its embodiments the present invention relates to an extraction process for the recovery of a particular compound from a mixture of organic compounds which comprises contacting said mixture with a solvent comprising a mixed ether of ethylene glycol and propylene glycol containing both oxyethylene and oxypropylene groups under conditions whereby said particular component selectively dissolves in said solvent.

A more specific embodiment of the present invention concerns a process for recovering an aromatic hydrocarbon from a mixture of the same with at least one of the group selected from naphthenic, olefinic and paraffinic hydrocarbons which comprises contacting under countercurrent flow conditions said mixture of hydrocarbons with a selective solvent comprising a mixed ether of ethylene and propylene glycols containing from 0.2 to about 6 oxyethylene groups per oxypropylene group and from 0.5 to about 40% by weight of water, forming thereby an extract phase comprising solvent and dissolved aromatic hydrocarbon and a raffinate phase comprising essentially non-aromatic hydrocarbons present in said mixture and thereafter distilling said extract phase to vaporize therefrom said aromatic hydrocarbon.

The solvent extraction process of this invention may be applied to any mixture of organic compounds, the individual components of which vary in their solubility in the mixed ether solvent provided herein. The component of a mixture of organic compounds which is selectively extracted therefrom by dissolution in a solvent when the latter is contacted with the mixture of organic compounds comprising the feed stock is the component having the greatest relative solubility of the compounds present in the organic mixture. Other components of the mixture may also dissolve to some extent in the solvent if the relative degree of solubility of the preferentially soluble component does not differ substantially from the solubility of the other components in the solvent. If the variation in solubility of the individual components in the solvent is slight, the selectivity of the solvent for the desired component is low and this is generally found to decrease as the solubility increases. It is therefore preferred that the mixture of organic compounds utilized as feed stock in a given solvent extraction process be made up of components which differ substantially in their solubility in the solvent, as in the case of aromatic hydrocarbon-paraffinic hydrocarbon mixtures where the aromatic component is ultimately desired as the product to be selectively recovered from the hydrocarbon mixture.

Suitable mixtures of organic compounds utilizable as feed stocks in the present selective solvent extraction process may comprise, for example, phenol and/or thiophenol mixtures with hydrocarbons, including aromatic hydrocarbons, the phenol and thiophenol being relatively more polar and therefore selectively recoverable from the feed stock by the present extraction procedure. In hydrocarbon mixtures containing an aromatic hydrocarbon such as benzene, for example, the benzene is the relatively more soluble component and is selectively recoverable from paraffinic, olefinic, or naphthenic hydrocarbons. Similarly, mercaptans and alkyl sulfides containing the relatively polar sulfhydryl (—SH) or sulfide (—S—) group also may be extracted from hydrocarbon fractions. Compounds containing monocarboxylic, mononitro, monoamino, monosulfhydral, monohydroxyl and other single electronegative polar groups may likewise be recovered from hydrocarbon mixtures thereof. The occurrence of unsaturated bonds in the carbon atom skeleton of the compound or between carbon and oxygen or other elements present in the structure of the compound, generally increases the solubility of the compound containing such unsaturated carbon atom linkages in the present mixed ether solvent, and such unsaturated compounds are therefore generally separable from other organic compounds of lesser degree of unsaturation. Thus, mono-olefins and particularly cycloolefins are separable from paraffinic hydrocarbons, and aromatic compounds containing an unsaturated nuclear hydrocarbon substituent, such as a vinyl group or other alkenyl group, may be separated from aromatic compounds of the same molecular weight containing an alkyl nuclear substituent. In the case of a hydrocarbon mixture comprising components of different structural classes, the solubility of each of the components in the present solvent decreases in the following order: aromatic, cyclodiolefinic, diolefinic, cyclo-olefinic, open-chain olefinic, naphthenic and paraffinic hydrocarbons, any member in the forepart of the series generally being separable from any succeeding member of the series having approximately the same boiling range. Within each class, hydrocarbons of lower molecular weight are more soluble in the selective solvent than those of higher molecular weight, so that members from the forepart of the above series of higher molecular weight may be equivalent in solubility to members from the latter part which have lower molecular weights. For this reason, feed stocks for use with these solvents should not be of excessively wide boiling range.

One of the outstanding and particularly useful feed stock mixtures for which the present selective solvent is particularly applicable for solvent extraction purposes and which generally cannot readily be separated by other methods of separation, such as distillation, fractional crystallization, etc., is an azeotropic mixture of hydrocarbons, such as a $C_6$ fraction of a petroleum distillate containing benzene, hexane, cyclohexane with more or less $C_5$ and $C_7$ hydrocarbons boiling in approximately the same range. The selective solvent employed in the present liquid phase extraction process is essentially composed of a primary solvent which has selective solubility for the organic component of the feed stock to be recovered and may also contain a secondary solvent having a boiling point substantially below the primary solvent and preferably a compound having a high heat of vaporization, such as water, which makes it suitable as a vapor stripping component in the selective solvent composition.

In specifying herein a mixed ether of propylene and ethylene glycols as the essential, or primary component of the solvent, it is intended to designate a true ether containing both oxypropylene and oxyethylene groups as well as alpha, omega hydroxyl groups (i. e. hydroxyl groups at both ends of the ether or polyether chain). The mixed ether glycol has the structure represented by the following empirical formula:

$$HO(C_2H_4O)_x(C_3H_6O)_yH$$

in which $x$ has a value of from 1 to about 6 and $y$ likewise has a value of from 1 to about 5 so that the ethers for use as selective solvents herein contain oxyethylene to oxypropylene groups (that is a ratio of $x/y$) of from about 0.2 to about 6. Of these preferred compounds are those in which the ratio of $x/y$ is between about 1 and about 3.

The mixed ether-glycols herein provided may be prepared by any suitable process known to the art, one of the preferred methods comprising the condensation of propylene or ethylene oxide or a mixture thereof with ethylene or propylene glycol, the condensation generally being effected in the presence of an alkaline base catalyst, such as powdered sodium hydroxide, sodium acetate, potassium carbonate, pyridine, tri-methylamine, and other mono-, di- and tri-alkylamines and ammonium hydroxides, at a temperature of from about —10° to about 150° C., utilizing superatmospheric pressures to maintain the reactants in substantially liquid phase during the condensation reaction. Thus, ethylene glycol or a polyethylene glycol such as oxydiethylene glycol, dioxytriethylene glycol, trioxytetraethylene glycol or higher polymeric glycols containing up to about 6 oxyethylene units per molecule may be reacted at the above specified condensation reaction conditions with propylene oxide to introduce from 1 to about 6 oxypropylene groups per molecule. Alternatively, propylene glycol or a "polymeric" propylene glycol such as dipropylene glycol, tripropylene glycol, or tetrapropylene glycol may be reacted with ethylene oxide at the indicated condensation reaction conditions to introduce from 1 to about 6 oxyethylene units per oxypropylene unit in the resulting mixed ether. In each instance by the above method of preparation, the time of reaction, the molar ratio of propylene or ethylene oxide to the glycol reactant present in the reaction mixture, the temperature and other reaction variables determine the ratio of oxyethylene to oxypropylene units in the resultant mixed ether-glycol product. In some cases, the product may best be made in several stages by alternate reactions with ethylene oxide and then propylene oxide, or vice versa.

Another alternative method of producing a mixed ether glycol comprises reacting ethylene chlorohydrin or propylene chlorohydrin with ethylene oxide or propylene oxide or a mixture thereof at condensation reaction conditions to introduce the remaining oxyalkylene groups which make up the mixed ether product. The reaction is effected at temperatures, pressures and for reaction periods corresponding generally to the methods hereinabove specified. The resulting chlorohydrin may be hydrolyzed in the presence of caustic to replace the halogen radical of the halo-hydrin with a hydroxyl group, thereby forming the desired mixed ether-glycol. The product glycol-ether may be prepared directly from the alkylene halohydrin, followed by hydrolysis of the resulting halohydrin ether, by reacting ethylene or propylene chlorohydrin with the other glycol which makes up the mixed ether, generally in the presence of an alkaline base catalyst and at condensation temperatures of from about 20° to about 100° C.

The preferred solvents of empirical formula $$HO(C_2H_4O)_x(C_3H_6O)_yH$$

in which $x$ and $y$ have the aforementioned meaning, are those in which $x+y=2$ to $5$. The preferred compounds include the following, among many others:

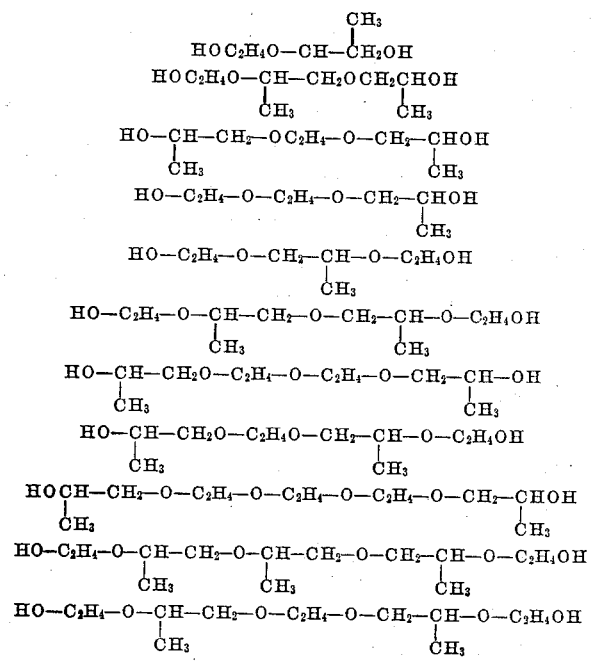

The ultimate choice of a suitable mixed glycol-ether in the present extraction process will depend upon the charging stock and the method of extraction. Thus, a feed stock mixture containing a readily extractable component (that is, readily soluble in the mixed ether-glycol solvent) mixed with feed stock components which are not readily extracted by the solvent may have a relatively high ratio of oxypropylene to oxyethylene units per molecule in order to reduce the solvent to feed stock ratio required for complete recovery of the extractable component from the feed stock mixture. On the other hand, the oxyethylene to oxypropylene ratio in the mixed glycol-ether may be relatively high in order to increase the selectivity of the extractable component of the feed stock in those instances where the solubility of the raffinate component in the selective solvent tends to approach the solubility of the extracted component in the solvent. In the latter type of mixed glycol-ether solvent, an increase in the ratio of oxyethylene to oxypropylene units in the same mixed ether solvent molecule tends to increase the selectivity of the solvent for the more readily extracted component of the feed stock, although it may also simultaneously reduce the solubility factor, requiring larger solvent to feed stock ratios in the extraction process.

The selective solvent utilized in the present extraction process also desirably contains a secondary solvent component which modifies the solubility characteristics of the feed stock mixture in the solvent by increasing its selectivity. The secondary solvent preferably has a boiling point substantially below the mixed glycol-ether, thereby providing a basis for operation of a stripping stage following the extraction for the recovery of the extracted component from the extract phase by distillation therefrom. For this purpose, the secondary solvent also desirably has a high heat of vaporization such that upon boiling the secondary solvent from the extract phase during the stripping operation, the vapors of secondary solvent carry a large proportion of extracted component from the extract phase. The secondary solvent component, therefore, serves at least two important functions in both the extraction and stripping stages of the present process: that is, it may serve to increase the selectivity of the solvent for the desired component to be recovered from the feed stock (simultaneously excluding the undesired raffinate components from dissolution in the solvent) and it may also provide a vaporizable stripping agent which by virtue of its higher vapor pressure enables the recovery of the extracted component from the extract phase. Suitable secondary solvents which are liquids at the pressure and temperature conditions utilized for extraction include such materials as furfural, furan, furfuryl alcohol, low molecular weight esters such as methyl acetate, ethyl acetate, methyl lactate and the like, low molecular weight alkyl cyanides and nitriles such as acetonitrile, ec., the nitro paraffins and the halogen-substituted nitroparaffins of low molecular weight such as nitromethane, nitroethane, dinitrobutane, nitrodichloropropane and others. One of the preferred secondary solvents particularly useful in the present process in admixture with the mixed glycol-ether primary solvent component is water which may be present in the selective solvent composition in amounts sufficient to yield an aqueous glycol containing up to about 40% by weight of water, and preferably from about 5% to about 20% by weight of water, depending upon the ratio of oxyethylene to oxypropylene groups per molecule of mixed glycolether and the nature of the feed stock.

The feed stock mixture of organic compounds having varying solubilities in the present selective solvent may be subjected to continuous solvent extraction, preferably by means of a countercurrent liquid-liquid contacting procedure. In the preferred countercurrent method of operation, the solvent is introduced near the top of the extraction column from which end a raffinate stream comprising non-extracted components of the feed stock is also removed, the liquid feed stock mixture being introduced into the extraction column at a point below the raffinate outlet, thereby providing for upward flow of the feed stock against a downwardly flowing stream of selective solvent. An extract phase comprising substantially all of the solvent and containing dissolved therein the extracted, relatively polar organic components of the feed stock mixture is removed from the extraction column below the point of entry for the feed stock and usually from the bottom of the extraction column. Following the removal of raffinate from the top of the extraction column and of rich solvent containing extract from the bottom of the column, the extract phase is subjected to separate treatment for the recovery of the desired, extracted component therefrom as a product of the extraction process. A particularly suitable method of recovering the extracted product from the extraction phase, particularly when utilizing a secondary solvent component in the selective solvent composition, comprises vaporizing a more volatile secondary solvent from the extract phase by heating the latter and thereby stripping the extracted organic component from the extract phase by the method referred to as vapor stripping. In the case of utilizing water as the secondary solvent component, the water has a boiling point substantially below that of the mixed glycol-ether and also has a desirably high heat of vaporization such that vaporization of the water in the stripping column carries a large proportion of the extracted feed stock component from the extract phase by steam distillation. The procedure and apparatus for effecting counter-current extraction with an organic solvent, and stripping the extract phase with a volatile vapor, such as steam, are well-known in the art and such suitable combination methods may be employed in the present process by appropriate adaptation to the particular feed stock and solvents selected for the process.

Selective solvent extraction of organic feed stock mixtures containing a relatively soluble component or components and one or more relatively insoluble components may generally be effected by contacting the feed stock mixture with the present solvent comprising the mixed glycol-ether of the above defined composition at temperatures of from about 30° to about 200° C., preferably from about 100° to about 180° C. (the upper temperature limit depending upon the thermal stability of the mixed ether-glycol) and at a superatmospheric pressure sufficient to maintain the feed stock and selective solvent in substantially liquid phase during the extraction operation, pressures of from atmospheric to about 25 atmospheres generally providing a suitably economical range for effecting the extraction process. The volume of solvent per volume of feed stock charged into the extraction zone depends upon the concentration of the relatively polar or otherwise soluble organic component in the feed mixture and also upon the selectivity and solubility factors which characterize the solvent, but generally volume ratios of solvent to feed stock of from about 1 to 1 to about 30 to 1 or higher may be employed in the operation of the solvent extraction equipment. In any given operation the particular operating conditions to be employed in the process must necessarily be determined for each feed stock, in conjunction with the solvent composition and the product purity requirements, the optimum conditions for operation being determined generally by selection and trial in accordance with well-known engineering procedures therefor.

The use of a mixed glycol-ether containing oxypropylene and oxyethylene units in the molecule in a typical solvent extraction process is further illustrated in the accompanying example, although in thus specifying particular operating conditions, particular solvent compositions, etc., it is not intended to limit the generally broad scope of the invention strictly in accordance therewith.

EXAMPLE

A mixed ether-glycol of propylene and ethylene glycols is prepared for use as selective solvent by reacting anhydrous propylene glycol with ethylene oxide at suitable reaction conditions to form a mixed ether-glycol containing an equal number of oxyethylene to oxypropylene units in the product. Five molecular proportions of propylene glycol are introduced into a pressure autoclave, followed by 1% by weight of powdered sodium hydroxide and one molecular proportion of ethylene oxide. The autoclave is heated to 80° C. and maintained at the latter temperature for 1.5 hours as the autoclave is slowly rotated. The contents of the reactor are thereafter cooled and the liquid product separated from the excess powdered sodium hydroxide catalyst. Substantially complete reaction of the ethylene oxide occurs during the reaction as evidenced by the absence of pressure at room temperature and the virtual absence of ethylene oxide in the distillation product recovered from the condensation reaction mixture. Distillation of the product under vacuum yields a mixed ether, $HOC_2H_4OC_3H_6OH$, of boiling point approximately 235–240° C., which is readily separable from the excess of propylene glycol.

Glycol-ethers containing two oxyethylene units per oxypropylene units are prepared by reacting anhydrous propylene glycol with two molecular proportions of ethylene oxide in accordance with the above procedure. Also characterized is the glycol-ether prepared by reacting propylene glycol with three molecular proportions of ethylene oxide.

A mixture of benzene and methylcyclopentane containing approximately 25% by weight of benzene is thereafter subjected to extraction with the products recovered from the above-prepared ethylene oxide-propylene glycol condensation products, varying amounts of water being added to the condensation product to form a mixture of primary and secondary solvents, thereby introducing the desired selectivity and solubility characteristics in the glycols. The extractions are conducted batch-wise in a stirred bomb containing the solvent and mixed hydrocarbon feed stock, the extraction being effected at a temperature of 121° C. for a period of 30 minutes by rotating the bomb containing the hydrocarbon feed stock and glycol-ether solvent. The mixture in the bomb is withdrawn therefrom and the resulting liquid phases allowed to settle into a lower extract phase and upper raffinate phase. Samples of the two layers are thereafter withdrawn and analyzed for hydrocarbon contents. The following Table I indicates the particular ratios of the solvent components, the solubility of the hydrocarbon feed stock and the selectivity of the solvent. The indication of solubility in Table I is a designation of the capacity of the solvent in dissolving hydrocarbons, while the selectivity factor is an indication of the relative order of the solubility of the aromatic and naphthenic components in the solvent, the latter selectivity factor indicating the effectiveness for extraction and recovery of the aromatic hydrocarbon component from the feed stock mixture. The selectivity factor is an empirical value, determined as follows:

$$\beta = \frac{C_A \text{ in extract}}{C_A \text{ in raffinate}} \times \frac{C_N \text{ in raffinate}}{C_N \text{ in extract}}$$

where $C_A$ and $C_N$ are the concentration of aromatics and the concentration of naphthenes, respectively, in the designated extract and raffinate phases.

*Table I*

EXTRACTION OF BENZENE-METHYLCYCLOPENTANE MIXTURES USING GLYCOL-ETHER SOLVENTS OF MIXED ETHYLENE AND PROPYLENE GLYCOLS

| Solvent: | | | | | | |
|---|---|---|---|---|---|---|
| Oxyethylene Units per mole of solvent | 1 | 1 | 1 | 2 | 2 | 3 |
| Oxypropylene Units per mole of solvent | 1 | 1 | 1 | 1 | 1 | 1 |
| Concentration of Water in solvent, wt. percent | 0 | 7.5 | 19 | 7.5 | 19 | 7.5 |
| Solubility of solvent: Total hydrocarbons in solvent, wt. percent of solvent phase | 18 | 11.0 | 8.6 | 9.7 | 4.3 | 8 |
| Selectivity of solvent: $\beta$ | 2.6 | 3.7 | 4.2 | 4.0 | 5.7 | 4.4 |

The above results indicate that as the ratio of oxypropylene to oxyethylene units in the glycol-ether increase, the total solubility of both raffinate and extract hydrocarbons (methylcyclopentane and benzene respectively) increases unless the water content of the solvent increases. The selectivity also decreases as the latter ratio increases but this factor may be adjusted in favor of producing a raffinate-free extract phase by adjusting the water content of the solvent. The results indicate, further, that a ratio of oxyethylene to oxypropylene units in the mixed ether solvent of from about 1 to 1 to about 3 to 1 is preferred, for the mixed ether-glycols on the basis of both the solubility and selectivity factors. The results also indicate that a substantially anhydrous solvent consisting of the mixed ethers has a high solubility factor, but the selectivity is less than desired, since the recovered extract phase contains an excessive quantity of the methylcyclopentane component to yield a benzene product of substantial purity. A solvent having the above indicated ratio of oxyethylene to oxypropylene units per molecule and containing from about 5% to about 20% by weight of water is preferred for preparing a substantially pure benzene extract product, the selectivity factor being sufficient to exclude methylcyclopentane from the recovered benzene product, particularly when a countercurrent type of extraction procedure, utilizing a reflux stream of aromatic hydrocarbon is employed.

A correlation of these results and of further experimental data related to the use of binary mixed ether-glycol solvents and water for extraction of aromatic hydrocarbons from paraffinic and olefinic hydrocarbon mixtures and on the basis of comparisons with physical mixtures of ethylene and propylene glycols individually indicate that the mixed glycol-ether compound primary solvents and their mixtures with water provide superior results when compared with the physically mixed individual glycols and water.

I claim as my invention:

1. A solvent extraction process which comprises contacting a feed stock containing an aromatic hydrocarbon with a solvent comprising a mixed ether-glycol of ethylene and propylene glycols having the empirical formula:

$$HO(C_2H_4O)_x(C_3H_6O)_yH$$

in which $x$ is a whole number having a value of from 1 to 6 and $y$ is a whole number having a value of from 1 to 5, thereby forming an extract phase and a raffinate phase, and separating said phases.

2. The process of claim 1 further characterized in that said solvent contains water in sufficient concentration to increase the selectivity of the solvent for said aromatic hydrocarbon.

3. The process of claim 2 further characterized in that said feed stock containing an aromatic hydrocarbon and at least one hydrocarbon class selected from the group consisting of naphthenic, olefinic additionally comprises paraffinic hydrocarbons.

4. The process of claim 2 further characterized in that said solvent contains from 0.5 to about 40% by weight of water.

5. A process as defined in claim 8 further characterized in that said mixed ether-glycol of ethylene and propylene glycols has the formula:

$$HOC_2H_4O-C_2H_4O-CH_2-\underset{\underset{CH_3}{|}}{C}HOH$$

6. A process as defined in claim 8 further characterized in that said mixed ether-glycol of ethylene and propylene glycols has the formula:

$$HO-C_2H_4-O-CH_2-\underset{\underset{CH_3}{|}}{C}HOH$$

7. A process for the recovery of an aromatic hydrocarbon from a mixture of the same with at least one member of the group selected from naphthenic, olefinic and paraffinic hydrocarbons which comprises contacting, under countercurrent flow conditions, said mixture of hydrocarbons with a selective solvent comprising a mixed ether of ethylene and propylene glycols having terminal hydroxyl groups and containing from 1 to about 3 oxyethylene groups per oxypropylene group and from about 0.5 to about 20% by weight of water, forming thereby an extract phase comprising said solvent and dissolved aromatic hydrocarbon and a raffinate phase comprising essentially non-aromatic hydrocarbons present in said mixture and thereafter distilling said extract phase to vaporize therefrom said aromatic hydrocarbon.

8. A solvent extraction process for the recovery of a particular class of hydrocarbon from a mixture of hydrocarbons of different solubilities in the solvent, said mixture containing an aromatic hydrocarbon and at least one member of the group consisting of naphthenic, olefinic and paraffinic hydrocarbons, which comprises contacting said mixture with and selectively dissolving said particular class of hydrocarbon in a solvent comprising a mixed ether-glycol of ethylene and propylene glycols having the empirical formula:

$$HO(C_2H_4O)_x(C_3H_6O)_yH$$

in which $x$ is a whole number having a value of from 1 to 6 and $y$ is a whole number having a value of from 1 to 5, thereby forming an extract phase comprising said solvent and said particular class of hydrocarbon and a raffinate phase comprising the undissolved portion of said hydrocarbon mixture, and separating said particular class of hydrocarbon from said extract phase.

References Cited in the file of this patent

UNITED STATES PATENTS

| | | |
|---|---|---|
| 1,633,927 | Davidson | June 28, 1927 |
| 2,141,443 | Stanley et al. | Dec. 27, 1938 |
| 2,357,028 | Shiras et al. | Aug. 29, 1944 |
| 2,414,252 | Ashburn | Jan. 14, 1947 |
| 2,520,611 | Roberts et al. | Aug. 29, 1950 |
| 2,706,182 | Pruitt et al. | Apr. 12, 1955 |